US006424285B1

(12) United States Patent
Perdue et al.

(10) Patent No.: US 6,424,285 B1
(45) Date of Patent: Jul. 23, 2002

(54) COMMUNICATIONS SYSTEM FOR REMOTE CONTROL SYSTEMS

(75) Inventors: Michael Kelly Perdue; James Allen Strothmann, both of Indianapolis; Michael Anthony Pugel, Noblesville, all of IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/341,028

(22) PCT Filed: Jan. 30, 1998

(86) PCT No.: PCT/US98/01858

§ 371 (c)(1),
(2), (4) Date: Nov. 12, 1999

(87) PCT Pub. No.: WO98/34208

PCT Pub. Date: Aug. 6, 1998

Related U.S. Application Data

(60) Provisional application No. 60/036,794, filed on Jan. 31, 1997, and provisional application No. 60/038,893, filed on Feb. 20, 1997.

(51) Int. Cl.$^{7}$ .......................... G08C 19/12; H04L 17/02

(52) U.S. Cl. ........................................ 341/176; 359/142

(58) Field of Search .......................... 341/176; 345/169; 348/735; 340/825.69, 825.72; 379/102.01, 102.03; 359/142, 145

(56) References Cited

U.S. PATENT DOCUMENTS 4,866,434 A 9/1989 Keenan
4,904,993 A 2/1990 Sato
5,034,997 A * 7/1991 Iwasaki ...................... 455/617
5,515,051 A 5/1996 Tanaka et al.
5,585,953 A * 12/1996 Zavrel ........................ 359/152
5,946,120 A * 8/1999 Chen .......................... 359/158

FOREIGN PATENT DOCUMENTS

EP 0721282 7/1996 .......... H04N/5/445
WO 96/36954 11/1996 ........... G08C/23/04

OTHER PUBLICATIONS

PCT Search Report dated Jun. 29, 1998.

* cited by examiner

*Primary Examiner*—Timothy Edwards
(74) *Attorney, Agent, or Firm*—Joseph S. Tripolo; Paul P. Kiel

(57) ABSTRACT

A communications system for transmitting and receiving remote control messages in an electronic remote control system. The present communications system uses a remote control message protocol which is particularly suitable for transmitting RF remote control messages with IR remote control messages in a time multiplexed fashion, wherein the RF remote control messages are transmitted during the pause intervals between IR remote control message transmission intervals. The present remote control message protocol includes a start sequence, comprising a MARK pulse and a SPACE of about equal duration, followed by a plurality of data fields. Each data field ends with an End of Field marker and the remote control message ends with an End of Message marker. The plurality of data fields comprises an addressing data field for specifying the destination device, a security code data field for allowing a specific remote control transmitter to control a specific destination device, a status field for specifying various status codes associated with the remote control message, a keycode field for carrying the remote control message payload, and a checksum field for verifying the transmission integrity of the remote control message. A remote control message based on the present message protocol may be expanded to include additional data fields and to expand pre-existing data fields.

17 Claims, 5 Drawing Sheets

COMMUNICATIONS SYSTEM FOR REMOTE CONTROL SYSTEMS

This application claims benefit of provisional application Nos. 60/036,794, filed Jan. 31, 1997 and 60/038,893, filed Feb. 20, 1997.

BACKGROUND OF THE INVENTION

The present invention relates to a communications system, and more particularly to a communications system for transmitting and receiving remote control messages to control electronic devices.

A variety of remote control systems that transmit and receive remote control messages to control various electronic devices are known. Such systems typically include a remote control device which comprises an input device, such as a keypad, for allowing user input, coupled to a controller which is in turn coupled to a signal transmitter. In response to a user input, the controller generates an appropriate remote control message using look up tables, and the like, from memory and causes a signal transmitter to transmit the remote control message. The signal transmitter may be designed to transmit the remote control message in a number of different forms, including, but not limited to, an IR signal and a RF signal.

One commonly used method of sending a remote control message is to transmit the message in IR signal form. Remote control devices that transmit IR signals are well known and commonly used with household electronic devices. The message format of the IR signal is determined by the manufacturer for each model and many such IR message formats are known and used. Each format specifies a set of message characteristics, which include, but are not limited to message duration, transmission and pause intervals and types of data carried in the remote control message.

However, there are several disadvantages associated with using IR signals to control an electronic device. First, the IR signal is directional and as such requires the user to point the remote control device toward the destination device for proper transmission performance. Also, the IR signal may have a relatively short range and be easily blocked by objects such as walls, floors, ceiling and the like, so a remote control device must generally be used in the same room in which the destination device is located.

Also, many existing IR signal message formats do not have sufficient data carrying capacity to transmit all of the different types of remote control data required for controlling many modern electronic devices. For example, in addition to the conventional remote control messages associated with household electronic devices, such as ON, OFF, Channel Up, Channel Down, etc., many modern electronic devices, such as satellite receivers, may require the remote control device to send other forms of data, such as ASCII character data. Many existing IR signal message formats are not designed to handle such additional forms of data and/or simply do not include enough capacity to carry the data.

Another method of sending a remote control message is to transmit the message in RF signal form. RF signals are generally non-directional and have greater range than IR signals. RF signals may also be transmitted through objects such as walls, and the like, so that the user can use the remote control device to control a device in a separate room. This extended range and ability to transmit messages through objects is beneficial in situations where a central device, such as a set top box or a satellite receiver, provides input to a plurality of devices located throughout different rooms in a building. Also, RF signal message formats generally have wider bandwidths, and thus have greater data carrying capacity, than existing IR signal formats.

As such, it is desirable to be able to use RF signals to control modern electronic devices. However, devices and methods using IR signals remain popular and are widely used. In order to maintain backward compatibility, i.e., allow a remote control device to control existing devices which utilize IR signals, a remote control device should also be capable of transmitting IR signals. Therefore, it is desirable to have an apparatus and a method for easily and efficiently transmitting some combination of IR and RF signals to take advantage of the features of the two signal transmission forms.

However, existing IR signal message formats, or protocols, are not totally suitable for transmitting remote control messages in RF form. Since, the RF signals have longer range and transmit through objects better than IR signals, a RF signal message format must include a method of preventing interference from neighboring RF signal transmitters. Also, existing IR signal message formats do not allow a remote control device to send different types of data, such as ASCII data, in addition to the standard IR signal commands. Further, existing IR signal message formats do not take full advantage of the increased bandwidth and expandability associated with RF signals. Limited use of the available bandwidth and limited expandability reduces the ability to efficiently transmit and receive additional data, as well as more complex data, thereby limiting the ability to add new types of remote control devices to an existing system and incorporate new features to existing remote control devices.

SUMMARY OF THE INVENTION

Therefore, what is needed is a communications system for use in a remote control system which provides for increased data carrying capacity and expandability. In particular, what is needed is a communications system which uses a message protocol that provides for the ability to efficiently transmit and receive an increased amount of data, as well as different types of data, compared to existing remote control message protocols. Further, what is required is a message protocol which can be expanded to carry an additional amount of data and/or more types of data, yet remain both forward and backward compatible with existing and future receiver/decoders.

The present invention involves a communications system that uses a message protocol which provides for the transmission and receipt of complex data, as well as different types of data, such as ASCII data, and allows for expansion of the message as required, in an efficient format. The present communications system and message protocol is suitable for transmitting and receiving remote control messages in RF signal form, and especially suitable for transmitting and receiving a RF signal in combination with an IR signal by time multiplexing the two signals.

In accordance with one aspect of the present invention a remote control apparatus is provided, comprising an input device for receiving remote control messages from a user, a signal transmitter, and a controller operatively coupled to the input device and the signal transmitter, the controller generating a remote control message and causing the signal transmitter to transmit the remote control message in response to the user input, the remote control message comprising a plurality of data fields, each of the data field ending with an end of field marker, the plurality of data fields comprising a status field having signal transmission information including a keycode type bit, and a keycode field having one of first and second data in accordance with a state of the keycode type bit.

In accordance with another aspect of the present invention, a remote control system is provided, comprising an input device for receiving remote control messages from a user, an IR signal transmitter, a RF signal transmitter and a controller operatively coupled to the input device, the IR signal transmitter and the RF signal transmitter, the controller generating an IR remote control message and a RF remote control message and causing the IR signal transmitter and the RF remote signal transmitter to transmit the IR and RF remote control messages, respectively, in a time multiplexed manner in response to the user input, the RF remote control message comprising a plurality of data fields, each of the data fields ending with an end of field marker, the plurality of data fields comprising a status field having signal transmission information including a keycode type bit, and a keycode field having one of first and second data in accordance with a state of the keycode type bit.

In accordance with another aspect of the present invention, a remote control apparatus is provided comprising an input device for receiving remote control messages from a user, a signal transmitter, and a controller operatively coupled to the input device and the signal transmitter, the controller generating a remote control message and causing the signal transmitter to transmit the remote control message in response to the user input, the remote control message comprising a start sequence comprising a pulse and pause period having about equal duration, a preamble field having data for addressing a destination device, a security code field having an identifier associated with said signal transmitter, a status field having signal transmission status information, a keycode field having either a first or second data in accordance with a keycode type bit in the status field, a checksum field for verifying transmission integrity of the remote control message and an end of message marker.

In accordance with another aspect of the present invention, a remote control apparatus is provided comprising a signal receiver adapted to receive a remote control message, a controller operatively coupled with the signal receiver, the controller adapted to decode and process the remote control message, the remote control message comprising a plurality of data fields, each of the data fields ending with an end of field marker, the plurality of data fields comprising a status field having signal transmission information including a keycode type bit, and a keycode field having one of first and second data in accordance with a state of the keycode type bit.

In accordance with another aspect of the present invention, a method of transmitting a remote control message is provided comprising the steps of: receiving a user input; generating a remote control message corresponding to the user input, the remote control message comprising a start sequence followed by a plurality of data fields and an end of message marker, each of the data fields ending with an end of field marker, the plurality of data fields comprising a preamble field having data for addressing a destination device, a security code field having an identifier associated with the remote control apparatus, a status field having transmission status information about the remote control message, a keycode field having data associated with the user input and a checksum field for verifying transmission integrity of the remote control message; and applying the remote control message to a signal transmission circuit.

BRIEF DESCRIPTION OF THE DRAWINGS

The invention will be described with reference to the accompanying drawings, wherein.

DETAILED DESCRIPTION OF AN EXEMPLARY EMBODIMENT

Figure 1:
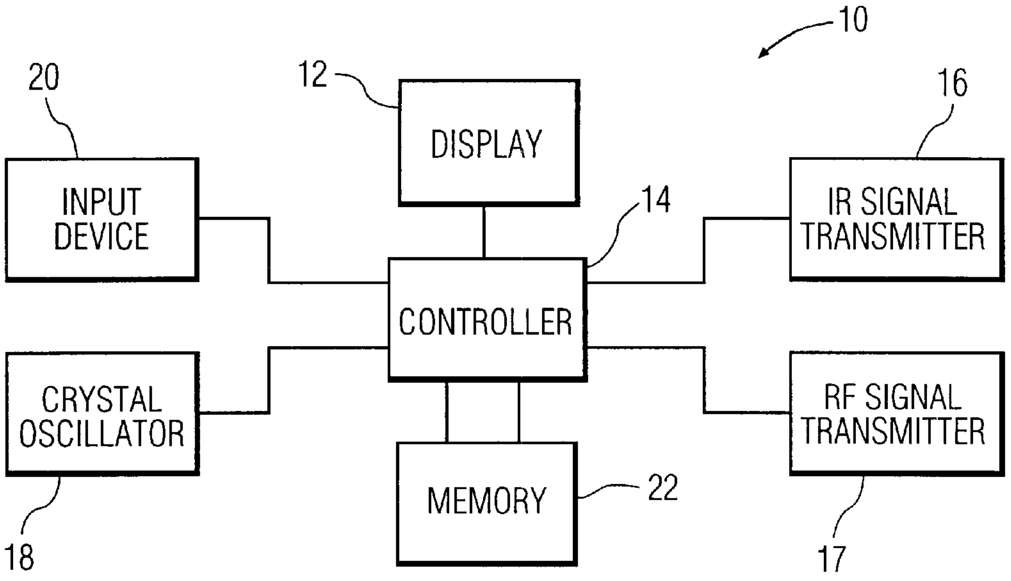
FIG. 1 is a block diagram showing the elements of a remote control device suitable for use in the present communications system.

Referring to FIG. 1, there is shown a simplified block diagram of remote control 10 suitable for use with the present communications system. Remote control 10 may take many forms, such as a stand alone unit or a portion of a larger communications device, and be adapted for use with a variety of electronic devices. For example, devices which incorporate the elements and signal transmission features of remote control 10 include, but are not limited to, a wireless keyboard, wireless pointing devices and handheld remote control devices for controlling consumer electronic devices. It is to be understood that the present remote control may be used with any system adapted to transmit, receive or process remote control messages in response to a user input.

Generally, user input is received through input device 20 which includes various control buttons, device selection buttons, numerical buttons and the like. It is to be understood that input device 20 may include any device whereby the user can provide an input to remote control 10 and includes, but is not limited to, a keypad matrix, mouse, trackball, joystick and other types of pointing devices. Input device 20 is operatively coupled to controller 14 which controls the overall operation of remote control 10. Controller 14 receives the user input, and generates and causes the transmission of an appropriate remote control message. Controller 14 may comprise any one of a plurality of conventionally known devices, which may be in integrated circuit form, that are capable of performing control functions. Suitable controllers include, but are not limited to ST 7291 and ST 7225 manufactured by SGS Thomson Microelectronics. The timing of controller 14 is controlled by crystal oscillator 18.

Upon receiving a user input from input device 20, controller 14 uses the designated reference code, or other identifying information to look up the desired information from the product code look up tables stored in memory 22 in order to identify and generate a remote control message having the correct signal structure. The signal structure characteristics include, but are not limited to, the proper carrier frequency, pulse width, pulse modulation and overall signal timing information. Memory 22 may comprise RAM and/or ROM and be located either internal or external to an enclosure associated with remote control 10. Controller 14 applies the appropriate remote control signal to IR transmitter 16 and/or RF transmitter 17 to send the signal to the destination device. Controller 14 also controls display 12, which may include, for example, indicator LEDs, to indicate that a remote control message has been transmitted. When the remote control message is transmitted, an IR receiver and/or a RF receiver associated with the destination device detects the remote control message and provides the message to the processor of the destination device for decoding and processing.

Figure 2:
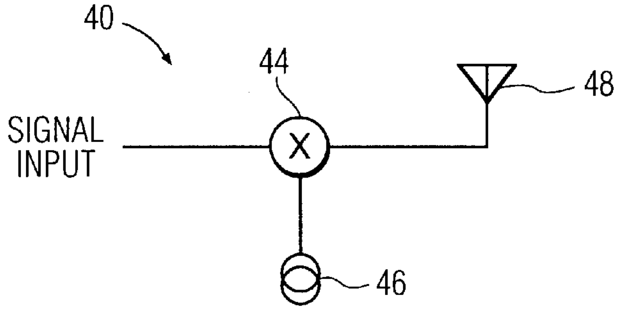
FIG. 2 is a block diagram illustrating the basic elements of a suitable RF signal transmitter.
Figure 3:
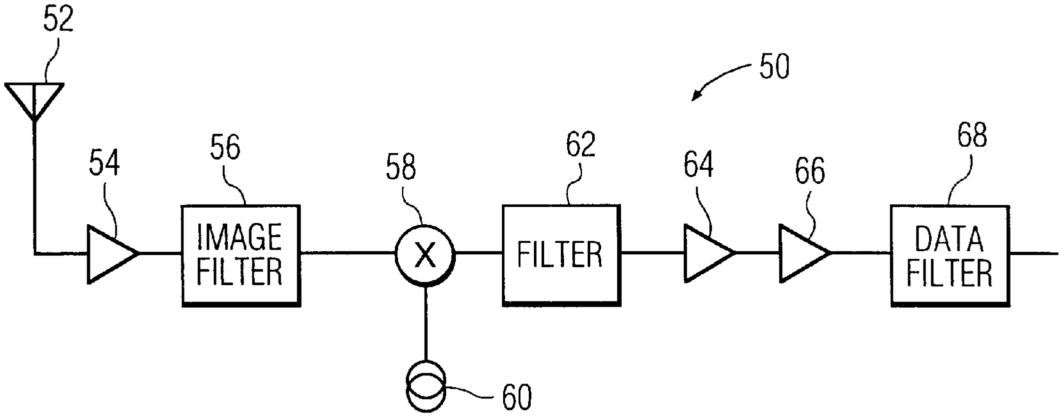
FIG. 3 is a block diagram illustrating the basic elements of a suitable RF signal receiver.

FIGS. 2 and 3 show RF transmitter 40 and RF receiver 50, respectively, suitable for use in sending and receiving RF messages in the present communications system. As shown in FIG. 2, RF transmitter 40 comprises bipolar oscillator 46 with a one-port SAW resonator for frequency stabilization coupled to mixer 44, which drives a linearly polarized loop antenna 48 which is typically located in the enclosure of remote control 10. When the user provides an input, for example by pressing a key, controller 14 generates a modulating signal which is used to turn oscillator 46 ON and OFF for amplitude shift keying of the carrier. It is generally desirable that transmitter 40 include minimal parts due to limited space in the enclosure of remote control 10.

A suitable RF receiver 50 is shown in FIG. 3. RF receiver 50 will typically be located in, or connected to, the enclosure of the destination device. The receiver is capcitively coupled to antenna 52, which may advantageously be a line cord that acts as a receive antenna, in which case the RF signal enters through a connector disposed on the enclosure around RE receiver 50. The signal is amplified by low-noise amplifier 54, which decreases the total system noise level while increasing receiver sensitivity. The output of amplifier 54 passes through image filter 56 which provides rejection to the image frequency. The signal is then converted via mixer 58 and local oscillator 60 to an intermediate frequency (IF) of 10.7 MHz. The IF signal is passed through filter 62 and amplified by a chain of high gain logarithmic amplifiers 64 which convert the signal into an output current. The output current is converted to a voltage, passed to a noise adaptive threshold comparator 66, and lowpass filtered by data filter 68 before being sent to the processor of the destination device for decoding and processing.

Any one of a number of conventionally known IR transmitter and IR receiver arrangements may be used to send and receive IR remote control messages in the present invention. Generally, an IR transmitter includes an LED coupled to an LED driver circuit which is controlled by controller 14. In response to a user input, controller 14 generates an IR remote control signal in accordance with the look up table in memory 22 and applies the IR remote control signal to the LED driver circuit. The LED driver circuit drives the LED to project an IR signal toward the controlled device. An IR light sensor in the IR receiver detects the IR signal and provides the signal to a processor in the destination device for decoding and processing. Suitable IR and RF transmitter and receiver arrangements include, but are not limited to, those found in DSS System DS5450RB manufactured by Thomson Consumer Electronics Inc., of Indianapolis, Ind.

Figure 4:
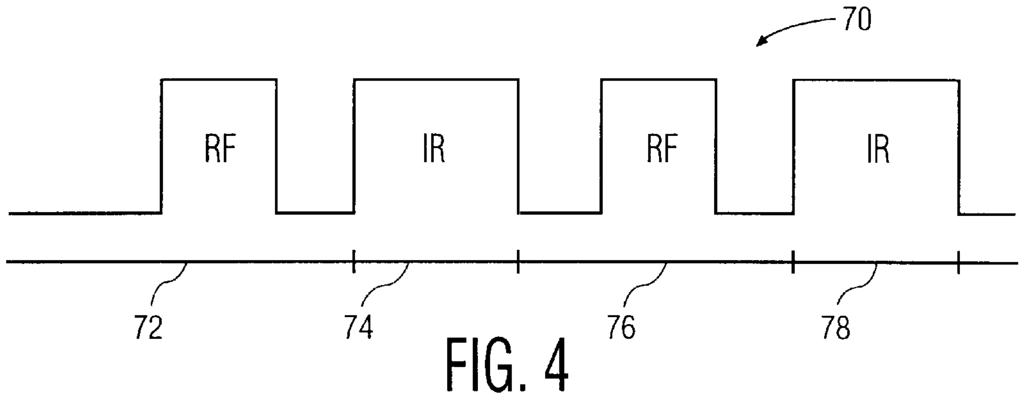
FIG. 4 is an illustration of a transmission sequence of IR and RF remote control messages wherein the IR and RF messages are transmitted in time multiplexed manner.

Remote control 10 transmits the IR signal, the RF signal or any combination thereof for controlling an electronic device in response to user input. Advantageously, in order to transmit both an RF signal and an IR signal for each user input, wherein each signal is generated according to a respective message protocol, remote control 10 may transmit the two messages in a time multiplexed manner. In particular, the IR and RF signals may be transmitted in alternating fashion with the RF signal transmitted during the pause interval of the IR signal as shown in FIG. 4. In signal transmission sequence 70, the IR signals are transmitted during intervals 74 and 78 while the RF signals are transmitted during pause intervals 72 and 76.

The transmission sequence described above is particularly suitable for use with existing IR signal protocols as such protocols usually require repeated intervals of IR signal transmission interrupted by pause intervals. RF signals can easily be transmitted during the pause intervals without affecting the IR signal transmissions. Typically, the pause interval between the IR transmissions lasts between 2–10 mS. Such a sequence may be implemented using relatively inexpensive controllers. An apparatus and a method for transmitting IR and RF messages in such a manner is described in co-pending U.S. patent application Ser. No. 09/331,996, entitled “Remote Control Apparatus and Method” which is assigned to the assignee of the present application.

The present communications system uses a remote control message protocol which is particularly suitable for transmitting RF remote control messages in the above-described multiplexed manner. The data field structure and associated timing of the present remote control message protocol allow a RF message using the present remote control message protocol to be easily transmitted in the pause intervals as described above. However, it is to be understood that the present remote control message protocol may be used with any signal transmission media, such as IR transmissions, and may be used for any message transmission method, and is not limited to use in multiplexed transmission schemes.

Figure 5:
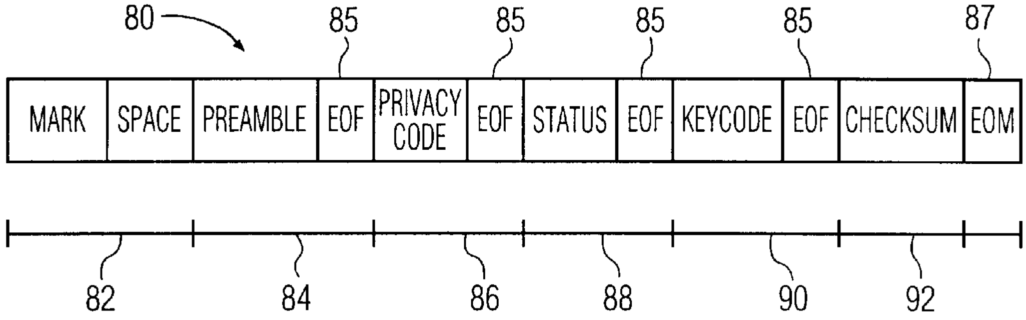
FIG. 5 is an illustration of the data fields in a remote control message protocol of the present communications system.

The structure of the present remote control message protocol is shown in FIG. 5. The remote control message 80 comprises a start sequence comprising MARK/SPACE combination 82 followed by a plurality of data fields. The illustrated remote control message comprises five data fields. However, as described further below, the number of data fields may be increased if the remote control message needs to be expanded in order to encompass increased functionality. Each field ends with End of Field (EOF) marker 85. Use of an EOF marker allows the size of a particular field to expand without changing the existing data fields in the message protocol. The end of the message is marked by End of Message (EOM) marker 87. Use of an EOM marker allows the number of fields transmitted in the remote control message to be increased without changing the existing data fields in the protocol. It can be seen that use of EOF marker 85 and EOM marker 87 allows the present message protocol to handle an increasing number of devices and functions without altering existing RF systems in the field.

Figure 6:
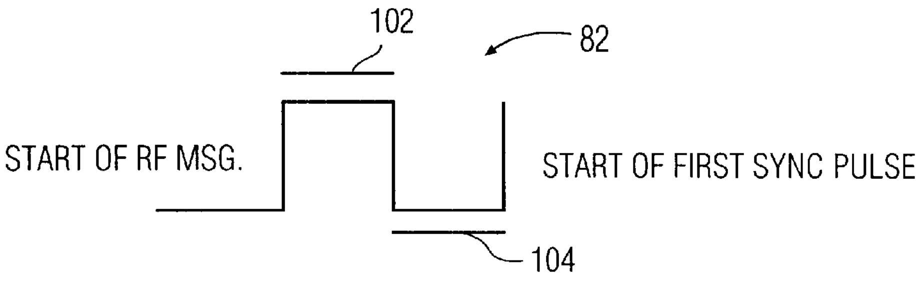
FIG. 6 is an illustration of the waveform of the MARK and SPACE portions of the remote control message protocol.

The format of MARK/SPACE combination 82 and the data within the data fields are now described. The MARK/SPACE combination 82, as shown in FIG. 6, signals the beginning of a new remote control message and is used by the destination receiver to distinguish the start of the message from pulses caused by background noise. MARK pulse 102 is designed to be wider than the sync pulses that make up the rest of the remote control message. The special length of MARK pulse 102 and the following pause period, namely SPACE 104, allows the receiver/decoder to recognize the beginning of the remote control message from background noise and partial messages from other remote control devices. Suitable timing for MARK pulse 102 and SPACE 104 are shown in table 1 below (units in uS):

TABLE 1

| | Minimum | Typical | Maximum |
|---|---|---|---|
| MARK pulse width | 90 | 100 | 110 |
| SPACE signal time | 90 | 100 | 110 |

Figure 7:
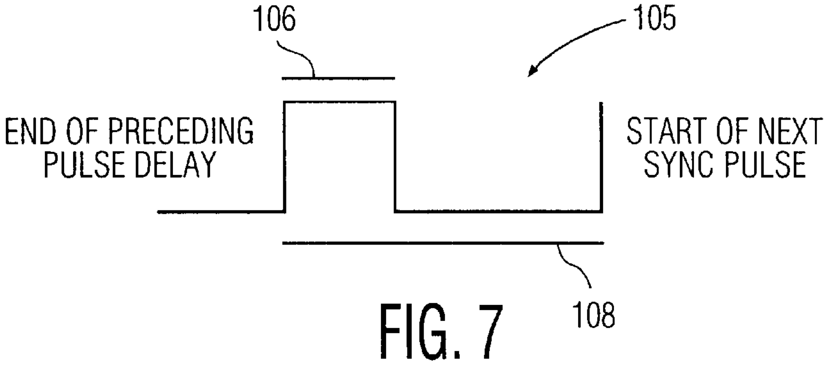
FIG. 7 is an illustration of a waveform of a symbol in the remote control message protocol.

Following the MARK and SPACE, the signal transmitter transmits a plurality of data fields. The data in each data field comprise a plurality of symbols including: "1", "0", and EOF. The remote control message ends with the EOM symbol. Each of the symbols comprises a waveform comprising a sync pulse and a pause space, and as shown in FIG. 7, waveform 105 is defined by sync pulse width 106 and total symbol time 108. Suitable values for the sync pulse width 106 and total symbol time 108 for each symbol are shown in table 2 below (units in uS, except EOM which is in mS):

TABLE 2

| | Minimum | Typical | Maximum |
|---|---|---|---|
| Sync pulse width (all symbols) | 45 | 50 | 55 |
| "1" total symbol time | 160 | 175 | 190 |
| "0" total symbol time | 210 | 225 | 240 |
| EOF total symbol time | 260 | 275 | 290 |
| EOM total symbol time | .30 | 65 | infinite |

Each data field contains 8 bits of data and is transmitted in the order of least significant bit first to the most significant bit last. The data fields also feature leading zero suppression to reduce data transmission time, whereby any of the most significant bits not transmitted for a particular byte when the EOF signal is received are assumed to be "0". The structure and transmission order, from left to right, of a sample data field is shown below:

BIT0 BIT1 BIT2 BIT3 BIT4 BIT5 BIT6 BIT7 EOF

If the field has at least one most significant bit that is zero (data byte less than 80 hex, bit 7 or more clear), then these bit(s) would not be transmitted and an EOF marker is transmitted after the final set bit. An EOM marker would replace the EOF marker for the last field, signaling the receiver that no more fields are forthcoming and processing of the message may begin.

Figure 8A:
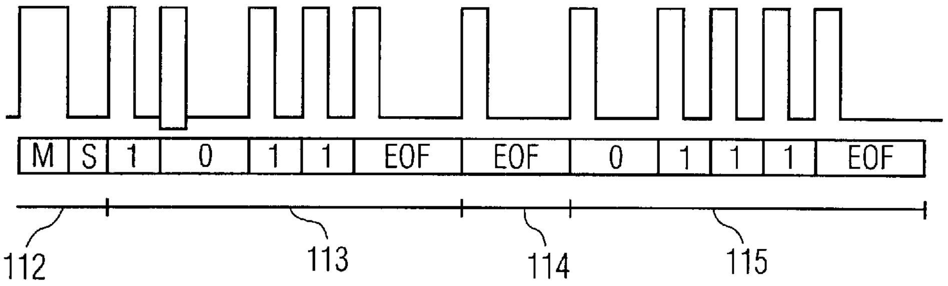
FIG. 8 is an illustration of a waveform of a remote control message using leading zero suppression.
Figure 8B:
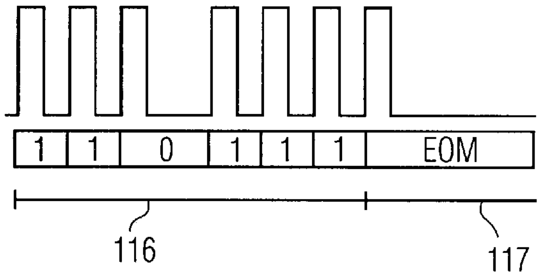

An example of a remote control message that demonstrates the use of leading zero suppression, as well as illustrates the use of the various symbols described above, is shown in FIG. 8. In FIG. 8, remote control message 110 comprises start sequence 112, followed by data fields 113–116 and EOM marker 117. Data fields 113–116 transmit "0D", "00", "0E" and "3B" respectively. Byte "00" is represented with only an EOF symbol, with all leading zero bits suppressed. Also, EOM marker 117 replaces the EOF marker for the last field 116.

The data associated with each of the data fields shown in FIG. 5 is now described. The preamble field comprises an identifying code associated with the destination device and is used to address the destination device. The code data in the preamble field may correspond to the preamble codes used in a pre-existing remote control message protocol, for example Thomson Consumer Electronics, Inc. Specification 15206770. All preamble fields for valid RF devices should correspond with the assigned preambles per the manufacturer's specifications. Advantageously, the preamble of future RF compatible products may be designed to be addressable using existing IR preamble codes.

The privacy code field comprises a 3 digit number in the range from 000–255 which is programmed into remote control device 10 by the user and uniquely identifies the source of the remote control message transmission. The privacy code allows the receiver to respond only to the proper remote control device and messages carrying incorrect privacy codes are ignored. The receiver for the destination device includes its own use interface for determining what privacy code to accept The privacy code feature is particularly advantageous in RF signal transmission applications for preventing neighboring RF transmitters from affecting the destination device and the present remote control device from affecting neighboring RF receivers. As such, the privacy code feature is particularly beneficial in densely populated areas wherein many other RF remote control devices may be operating. The preamble and security code fields are transmitted first to allow early rejection of the message by the destination device to improve the performance of the system.

The privacy code feature also provides for additional addressing capability if several receivers within range use the same preamble code. For example, if a user wishes to control 4 Digital Satellite System ("DSS") receivers wherein the DSS remote control which includes keys for "DSS 1" and "DSS 2", a pair of DSS receivers may be associated with "DSS 1" key and configured to respond to a first and second privacy codes, respectively, and another pair of DSS receivers may be associated with "DSS 2" key and configured to respond to the first and second privacy codes, respectively.

Any conventionally known method for programming remote control devices may be used to assign the security codes, for example, the user may program the remote control device by pressing an appropriate device key, for example, TV, VCR or DSS, and then entering a security code, for example a three digit code. Alternatively, the user may be guided through the programming sequence by an appropriate user interface, for example, a menu on an On Screen Display.

The status field provides status information about the remote control message transmission and includes the following flags:

Bit 7–Bit 2: currently unused

Bit 1: Keycode type

Bit 0: Keypress status

The keycode type bit (bit 1) indicates that the data carried in the keycode field is one of two types of data depending on the status of bit 1, for example a standard Thomson Consumer Electronic ("TCE") keycode data or ASCII character data byte from an alternative device, such as a keyboard, mouse, trackball, etc.

The keypress status bit (bit 0) toggles with each new key press on remote control device 10. The keycode type bit, along with timing of the message separation assists the receiver in determining whether a message is a repeated message from a single keystroke or the result of another key press on remote control device 10. As described further below the keycode type bit is used in a debouncing method to distinguish new keypresses of remote control 10 from old ones thereby preventing the receiver from performing multiple responses to a single keypress on remote control device 10.

Bit 7 through bit 2 are reserved for future expansion and should default to a "0" to take advantage of the leading zero suppression feature of the present remote control message protocol.

The keycode data field includes the data associated with the user input, such as a command or character data associated with a particular key. The data carried in this field may comprise data of any suitable format for transmitting the user input. In the present remote control message protocol, the data carried in this field comprises either a standard 8-bit keycode associated with a pre-existing IR protocol, such as the Thomson Consumer Electronics, Inc. Specification 15206770, or an ASCII character data byte depending on the status of the keycode type bit in the status field.

The checksum byte field is used to verify accurate receipt of the remote control message for all fields in the remote control message up to, but not including the checksum field. All fields preceding the checksum field are summed using 8-bit addition and the result is transmitted in the checksum field.

The present remote control message protocol may be modified to add additional data to the message while maintaining forward and backward compatibility with future remote control transmitters and receivers. Modification of the present remote control message protocol may be necessary, for example, to accommodate additional electronic devices or additional functions for a particular electronic device. The modification to the present remote control message protocol may take many forms, including, but not limited to, adding a new field of data, expanding a field beyond 8 bits, and adding additional status bits.

Figure 9:
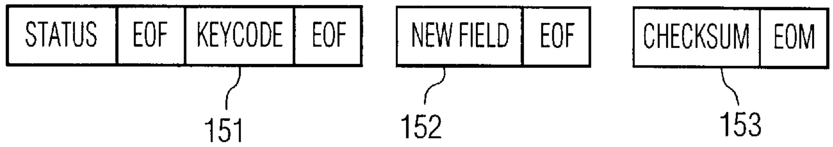
FIG. 9 is an illustration of adding a new data field in the remote control message protocol.

Modification of the present remote control message protocol to add a new data field is illustrated in FIG. 9. A new data field may be required due to, for example, the addition of a new feature in remote control device 10 or in the destination device. The new field 152 is inserted between the existing data fields 151 and checksum field 153, which is always the last field of the message. The additional data field increases the overall length of the remote control message, but does not affect existing data fields 151 of the remote control message. In this manner, the present remote control message protocol may be easily modified to add additional features and still be able to control destination devices that are based on older versions of the protocol.

Figure 10:
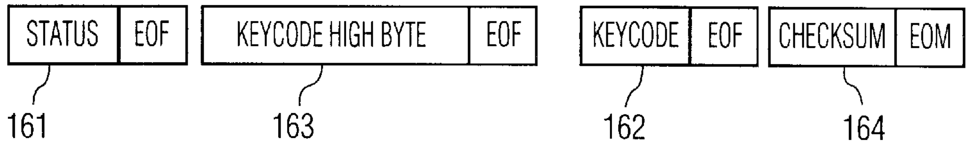
FIG. 10 is an illustration of expanding a pre-existing field in the remote control message protocol.
Figure 11:
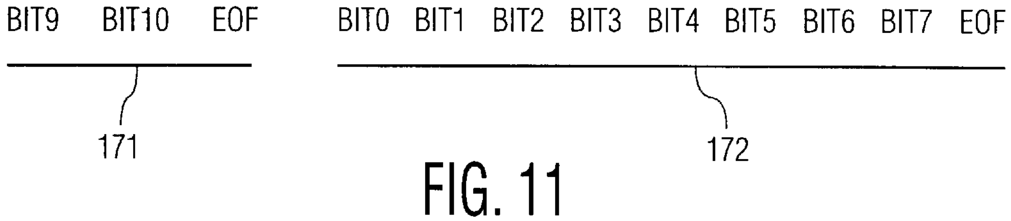
FIG. 11 is an illustration of using leading zero suppression when expanding a pre-existing field in the remote control message protocol.

Modification of the present remote control message protocol to expand a field size is illustrated in FIG. 10. Expansion of a field may be necessary to accommodate, inter alia, additional types of remote control devices and increased functionality of existing remote control devices. If a field requires an increase in size beyond 8 bits, a new field is added and placed immediately before the original field that required expansion. In the example shown in FIG. 10, expansion of the keycode field is realized by adding a keycode high byte field 163 between status field 161, and keycode field 162 and checksum field 164. If the expansion of the keycode requires an increase from 8 to 10 bits, then the bits would be transmitted in the order shown in FIG. 11. In such a case, bits 9 and 10 of the keycode high byte would be located in bit 0 and 1 of the high byte field 171, respectively, while the remaining bits are transmitted in field 172. Field 172 should always be transmitted, even if the additional bits are all "0" and only the EOF symbol is transmitted. This allows the decoder in the destination device to distinguish what version of the protocol is being transmitted.

With regard to adding additional status information, the additional status bits are allocated starting from the first available unused least significant bit to reduce transmission time. If all 8 bits of the status field become allocated, an additional field is added, as described above, immediately prior to the existing status field.

A receiver/decoder may be programmed to determine the version of the received remote control message by examining the number of fields and/or the number of bits in a particular field of data. By determining the remote control message version in this manner, current receiver/decoders can maintain forward compatibility, i.e., process future version of the present remote control message protocol, and future receiver/decoders can maintain backward compatibility, i.e., process past versions of the present remote control message protocol.

Forward compatibility is maintained by designing the receiver/decoder to process additional fields from future versions of the protocol only for the purpose of calculating the checksum and assume the last field to be the checksum byte. For example, since the original version of the present remote control message protocol contains 5 fields, receiver/decoders designed to process only this version of the remote control message protocol would use only the first four fields and disregard the remaining fields, but would sum all of the field in the received remote control message, including those after the first four, for the checksum and compare the result to the checksum field. Future transmitters utilizing the present remote control protocol should be designed to send the checksum field last so earlier version receiver/decoders will correctly process the basic message.

Backward compatibility is maintained by designing the receiver/decoder to always check for earlier versions of the remote control message protocol by examining the number of data fields received and process the remote control message accordingly. If a status bit is added to the original status field, then the polarity of the new flag should be oriented such that an older version remote, i.e., one that does not transmit the bit and thus defaults it to "0", does not cause any unwanted action in the receiver.

As indicated above, the present remote control message protocol is particularly suited for transmission in RF signal form, especially during the pause intervals of IR remote control signal transmission intervals. The waveforms defined above and their associated timing ensure that the RF messages can be transmitted during such periods without adversely affecting the IR transmission. The present message protocol also allows additional types of data to be transmitted and allows for expansion to accommodate increased functionality, as well as permit forward and backward compatibility. Further, the present message protocol provides for security codes for preventing unwanted interference from other RF remote controls.

Figure 12:
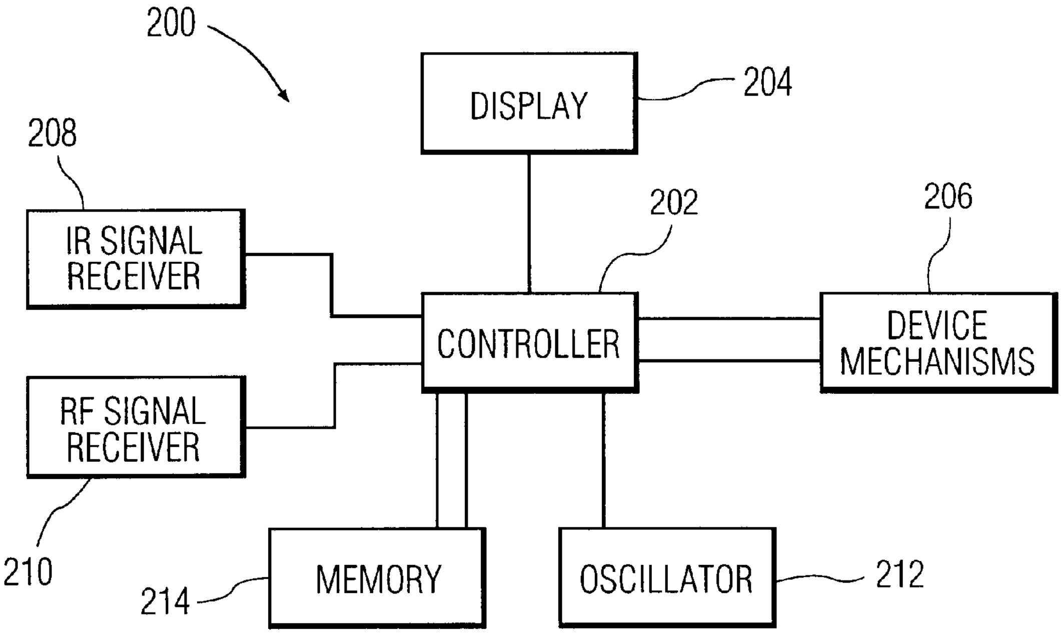
FIG. 12 is a block diagram illustrating the basic elements of a signal receiver/decoder suitable for use in the present communications system.

A suitable receiver for detecting, decoding and processing the IR and RF signals discussed above is now described. As shown in FIG. 12, suitable receiver 200 comprises controller 202 which receives the IR and RF signals through IR signal receiver 208 and RF signal receiver 210. Controller 202 decodes and processes the received remote control signal and sends control signals to device mechanism 206 to perform the operation specified by the received remote control signal. Device mechanism 206 comprises any one of a plurality of components included in an electronic device that may be controlled by the remote control signal. Such components include, but are not limited to, RF tuners, VCR tape transport, DSS transport decoder and TV tube deflection hardware. Controller 202 is also connected to memory 214 and display 204, which may include, for example a front panel indicator for displaying the status of the receiver, a set of indicator lights, an alpha-numeric display or a display screen. The timing of controller 202 is controlled by oscillator 212.

When an IR signal is directed at receiver 200, IR signal receiver 208 detects and provides the IR signal to controller 202. Controller 202 decodes and processes the received IR signal based on the appropriate IR format specification. Likewise, controller 202 receives RF signals via RF signal receiver 210 and decodes and processes the received RF signal based on the appropriate RF format specification. The elements of receiver 200 and their operation are generally known in the art.

Receiver 200 may be designed to perform the receiving, decoding and processing functions in a number of predetermined modes or modes selected by a user. First, controller 202 may be programmed to decode and process the IR and RF signals in the order that the signals are received. In such a case, controller 202 sends the necessary control signals to receiver mechanism 206 as the respective remote control signals are detected.

Second, receiver 200 may be arranged to decode and process the incoming signals according to a predetermined priority or a priority selected by a user. For example, if IR signals are selected as higher priority, controller 202 may be programmed to ignore RF signals, or to store the RF signals for processing at a later time if IR signals are present. Also, higher priority may be given to a particular signal in the form of interrupting the decoding process to service the higher priority signal. For example, if IR signals are selected as higher priority, controller 202 may be programmed to temporarily stop processing RF signals anytime an IR signal is detected. The priority selections may be made using any conventionally known method, including, but not limited to using an On Screen Display menu.

Receiver 200 may also be arranged to respond to only one type of signal, or set of signals, and ignore other type of signals. For example, if receiver 200 is programmed for use with only IR signals, controller 202 would ignore all RF signals. Again, receiver 200 may be selected to respond to or ignore particular signals using conventional user interface methods. Although FIG. 12 shows IR signal receiver 208 and RF signal receiver 210, it is to be understood that the receiver arrangements described above may be implemented in a receiver having a plurality of signal receiver types and any number of signal receivers.

Due to the repeated RF signal transmission intervals associated with each user input and the possibility of interference corrupting individual messages when the present remote control message protocol is transmitted in RF form, a RF receiver/decoder associated with the destination device should contain processing to determine if a received message should be acted upon or ignored. A suitable processing method is described below. Such a method may be implemented on the RF receiver/decoder by programming a destination device controller as known in the art. The present method allows the RF receiver/decoder to distinguish new keypresses of remote control 10 from old ones. This is necessary to prevent the RF receiver/decoder from performing multiple responses to single keypresses of the remote. The two basic inputs to the present method are the timing from the last operation and the state of a keypress status bit in the status field of the message protocol described above.

The timing from the last operation is measured by two separate timers, a short timer and a long timer. The timers may be implemented in software or in hardware, e.g., as part of the controller IC. The short timer determines if the repeated messages from a single remote keypress have come to an end or if a message is missing from the middle of a repeated sequence. The long timer is used to determine if a keypress status bit should be checked. The keypress status bit is a status flag that is toggled with each keypress. Suitable timer values for the short timer are 4–6 mS and for the long timer are 900–1100 mS.

The short timer is setup for a time that would not expire when a repeated RF message is received, yet will expire if a message is missing from the repeated sequence due to interference or a key release. The long timer is setup for the period that the requested function should be repeated if a remote key is held down indefinitely. The timers are reset after the RF receiver performs the requested operation from the remote and run until the receiver processes a new valid RF command.

Figure 13:
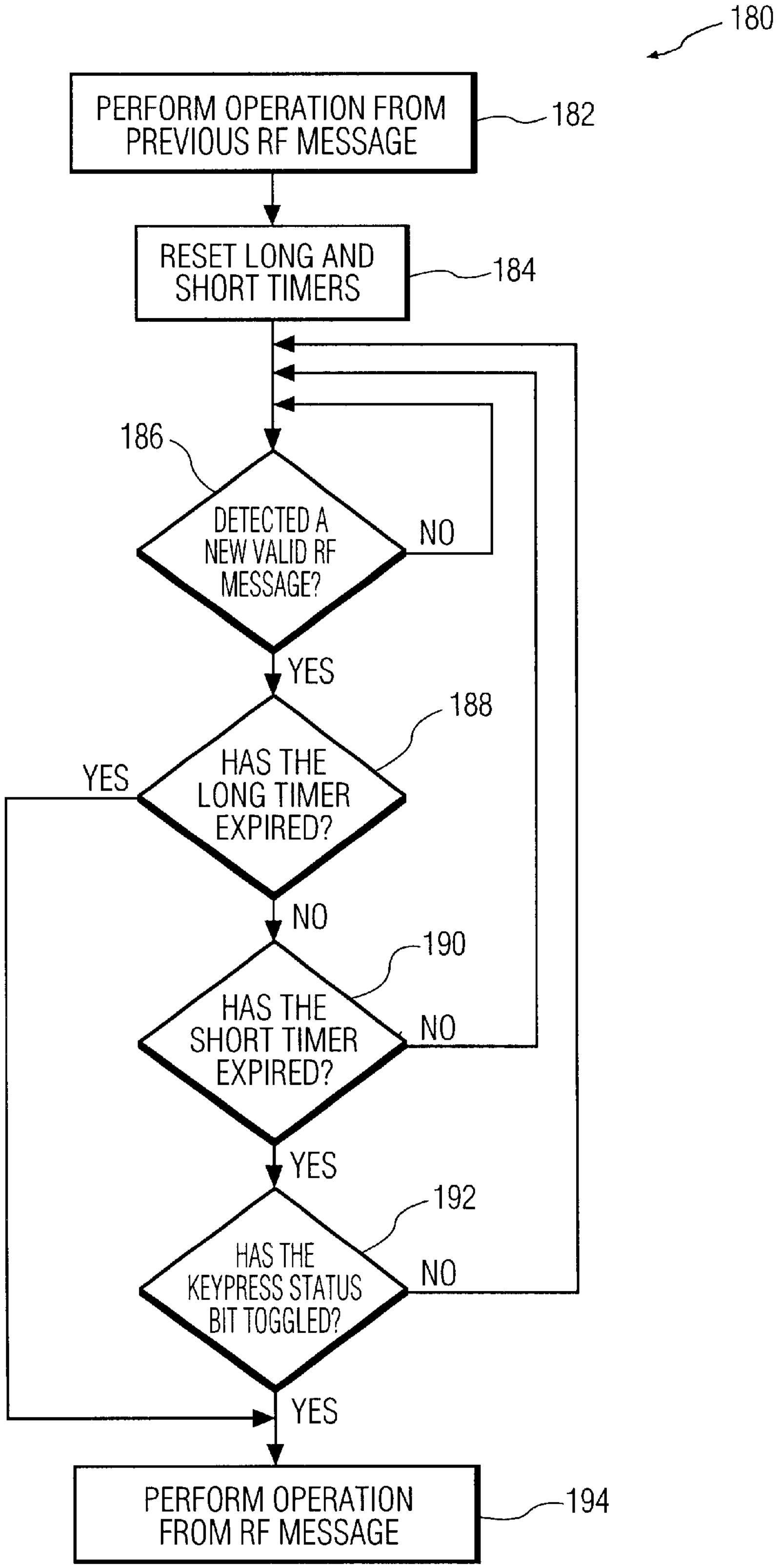
FIG. 13 is a flowchart diagram illustrating the steps of a debouncing method.

A flowchart for implementing the present method is shown in FIG. 13. After performing the operation from the previous RF message in step 182, the RF receiver controller resets the long and short timers in step 184 and waits for a new RF message. When a new RF message is detected in step 186, the receiver controller determines whether the long timer has expired in step 188. If so, the receiver controller performs the operation of the new RF message. If not, the receiver controller checks whether the short timer has expired in step 190. If not, the receiver controller returns to step 186 to detect a new valid RF message. If so, the receiver controller checks whether the keypress status bit has toggled in step 192. If so, the receiver controller performs the operation of the new RF message. If not, the receiver controller returns to step 186 to detect a new valid RF message. Therefore, it can be seen that the operation for a new RF message is performed if the long timer has expired or if the short timer has expired and the keypress status bit in the RF message has toggled to indicate a new keypress.

The present remote control message protocol is suitable for use in automatically detecting the message format wherein a detector is programmed to automatically determine the format, or version, of the message protocol based on the data transmission speed. Such an automatic format sensing method advantageously utilizes the leading zero suppression feature of the present remote control message protocol. In the leading zero suppression technique, the first bit transmitted is always a logic one, therefore, a signal receiver may be adapted to determine the speed of data transmission by measuring the width of the first symbol. Knowing that various data transmission speeds correspond to various formats, the receiver and associated processor may be adapted to automatically sense which format is being received and adjust the decoding accordingly. In the embodiment described above, controller 202 would be programmed to automatically determine the incoming message format by measuring symbol width 108 of the first symbol after start sequence 82 in message 80.

The determination of data transmission speed need not be limited to a determination based on a width measurement of the first symbol. The structure of the present remote control message protocol is based on symbol encoding of a basic time interval. Therefore, any part of, or the entire message may be used to determine the data transmission speed and format, for example, the EOF marker. Specifically, if memory is available to store the entire message without decoding in on the fly, many powerful signal processing techniques can be used.

Adjusting the data transmission speed may be useful for allowing faster formats for the future that are compatible with the existing formats. However, it is to be understood that the present automatic format sensing method is not limited to faster formats. A slower speed implementation could also be used, for example, if the implementation provided a cost advantage.

The speed values may be limited to discrete values or allowed to vary over a continuous scale. In this regard, limiting the speed values to discrete values may be more advantageous than allowing a continuously varying scale for the pulse widths due to environmental noise factors and pulse distortions in the receiver.

It will be apparent to those skilled in the art that although the invention has been described in terms of an exemplary embodiment, modifications and changes may be made to the disclosed embodiment without departing from the essence of the invention. For example, remote control 10 may be of the universal remote control type which is capable of controlling one of a plurality of designated electronic devices according to a reference code, or other signal format identifying information, selected by the user. The reference code may be selected using for example, the direct, manual entry method, the semi-automatic stepping entry method, the automatic entry method, or any other suitable method of selecting and entering a reference code. In that case, remote control 10 uses the identifying information to generate the appropriate signal associated with the particular manufacturer and model.

Therefore, it is to be understood that the present invention is intended to cover all modifications as would fall within the true scope and spirit of the present invention.

What is claimed is:

1. A remote control apparatus, comprising:

an input device for receiving remote control messages from a user;

a signal transmitter; and a controller operatively coupled to said input device and said signal transmitter, said controller generating a remote control message and causing said signal transmitter to transmit said remote control message in response to the user input, said remote control message comprising start sequence followed by a plurality of data fields, each said data field ending with an end of field marker, said plurality of data fields including a status field having a message type identifier which identifies a particular message protocol, and a keycode data field carrying keycode data, said keycode data formatted in accordance with said particular message protocol.

2. The remote control apparatus of claim 1, wherein said keycode data comprises one of a standard remote control protocol formatted data and ASCII character data.

3. The remote control apparatus of claim 1, wherein said start sequence comprises a pulse and a pause period having substantially equal duration.

4. The remote control apparatus of claim 1, wherein said remote control message further comprises an expansion data field and an end of message marker, said controller transmitting said remote control message in the order of, said start sequence, said plurality of data fields, said expansion data field, and said end of message marker.

5. The remote control apparatus of claim 1, wherein said remote control message further comprises a field expansion data field associated with one of said plurality of data fields and an end of message marker, said controller transmitting said field expansion data field immediately prior to said associated data field.

6. The remote control apparatus of claim 1, wherein said signal transmitter is a RF signal transmitter.

7. The remote control apparatus of claim 6, wherein said plurality of data fields further comprises a preamble field having data for addressing a destination device, a security code field having an identifier associated with said signal transmitter, and a checksum field for verifying transmission integrity of said remote control message.

8. The remote control apparatus of claim 7, wherein said security code data comprises a three digit code programmed into said controller by the user.

9. The remote control apparatus of claim 7, wherein said controller generates said remote control message using leading zero suppression.

10. The remote control apparatus of claim 9, wherein said security code data is programmed into said controller using an On Screen Display menu.

11. A remote control system, comprising:

an input device for receiving remote control messages from a user;

an IR signal transmitter;

a RF signal transmitter; and a controller operatively coupled to said input device, said IR signal transmitter and said RF signal transmitter, said controller generating an IR remote control message having pause intervals and a RF remote control message, said RF remote control message comprising a start sequence having a pulse and a pause period having substantially equal duration followed by a plurality of data fields, each said data field ending with an end of field marker, said plurality of data fields including a status field having a message type identifier which identifies a particular message protocol, and a keycode data field carrying keycode data, said keycode data formatted in accordance with said particular message protocol, said controller causing said IR signal transmitter and said RF signal transmitter to transmit said IR and RF remote control messages, wherein said RF remote control message is transmitted during the pause intervals of said IR remote control message.

12. The remote control apparatus of claim 11, wherein said keycode data comprises one of a standard remote control protocol formatted data and ASCII character data.

13. The remote control apparatus of claim 11, wherein said RF remote control message is transmitted in the order of, said start sequence, a preamble field having data for addressing a destination device, a security code field having an identifier associated with said signal transmitter, said status field, said keycode field, a checksum field for verifying transmission integrity of said RF remote control message and an end of message marker.

14. The remote control apparatus of claim 13, wherein said controller generates said RF remote control message using leading zero suppression.

15. The remote control apparatus of claim 13, wherein said security code data comprises a three digit code programmed into said controller by the user.

16. The remote control apparatus of claim 15, wherein said security code data is programmed into said controller using an On Screen Display menu.

17. A method of transmitting a remote control message, comprising the steps of:

receiving a user input through an input device;

generating an IR remote control message associated with the user input, the IR remote control message having pause intervals;

generating a RF remote control message corresponding to the user input, the RF remote control message comprising a start sequence having a pulse and a pause period having substantially equal duration followed by a plurality of data fields and an end of message marker, each said data field ending with an end of field marker, said plurality of data fields comprising a status field having a message type identifier which identifies a particular message protocol, and a keycode data field having keycode data formatted in accordance with the particular message protocol; and transmitting the IR and RF remote control messages by transmitting the RF remote control message during the pause intervals of the IR remote control message.

* * * * *